US011277539B2

(12) United States Patent
Ulichney et al.

(10) Patent No.: US 11,277,539 B2
(45) Date of Patent: Mar. 15, 2022

(54) ENCODING INFORMATION USING DISJOINT HIGHLIGHT AND SHADOW DOT PATTERNS (71) Applicant: Hewlett-Packard Development Company, L.P., Spring, TX (US)

(72) Inventors: Robert Ulichney, Stow, MA (US); Matthew D. Gaubatz, Seattle, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/963,322

(22) PCT Filed: Jun. 15, 2018

(86) PCT No.: PCT/US2018/037747
§ 371 (c)(1),
(2) Date: Jul. 20, 2020

(87) PCT Pub. No.: WO2019/182629
PCT Pub. Date: Sep. 26, 2019

(65) Prior Publication Data
US 2021/0368059 A1 Nov. 25, 2021

(30) Foreign Application Priority Data
Mar. 20, 2018 (WO) ................ PCT/US2018/023340

(51) Int. Cl.
*H04N 1/32* (2006.01)
*H04N 1/405* (2006.01)
*G06K 15/02* (2006.01)

(52) U.S. Cl.
CPC ..... *H04N 1/32251* (2013.01); *G06K 15/1892* (2013.01); *H04N 1/32219* (2013.01); *H04N 1/32309* (2013.01); *H04N 1/4055* (2013.01)

(58) Field of Classification Search
CPC . H04N 1/32144–32352; H04N 1/4055; G06K 15/1892
See application file for complete search history.

(56) References Cited

U.S. PATENT DOCUMENTS 5,323,245 A 6/1994 Rylander
5,946,414 A 8/1999 Cass et al.
(Continued)

FOREIGN PATENT DOCUMENTS

CN 1317763 A 10/2001
CN 1959545 A 5/2007
EP 0789480 8/1997

*Primary Examiner* — Scott A Rogers
(74) *Attorney, Agent, or Firm* — International IP Law Group PLLC (57) ABSTRACT

In an example method, a first dot pattern of shadow dots and second dot pattern of highlight dots is generated. The first dot pattern and second dot pattern include information to be encoded across the image. The first dot pattern and the second dot pattern are mapped to a corresponding subset of the greyscale source pixels, the greyscale source pixels corresponding to an image to be printed. A value of a greyscale pixel in the subset of the greyscale source pixels is modified based on a predetermined threshold pixel value. The value of the greyscale pixel is set to a highlight dot value in response to detecting that the predetermined threshold pixel value is exceeded or set to a shadow dot value in response to detecting that the predetermined threshold value is not exceeded. The image including the subset of pixels with modified values is printed.

15 Claims, 10 Drawing Sheets (56) References Cited

U.S. PATENT DOCUMENTS

| | | | |
|---|---|---|---|
| 6,031,627 A * | 2/2000 | Kakutani | H04N 1/40087 |
| | | | 358/1.9 |
| 6,738,491 B1 | 5/2004 | Ikenoue et al. | |
| 7,027,189 B2 | 4/2006 | Umeda | |
| 7,028,902 B2 | 4/2006 | Xu et al. | |
| 7,149,451 B2 | 12/2006 | Uchida et al. | |
| 7,234,645 B2 | 6/2007 | Silverbrook et al. | |
| 7,385,730 B2 | 6/2008 | Ogasahara et al. | |
| 7,609,851 B2 | 10/2009 | Guan et al. | |
| 7,783,073 B2 | 8/2010 | Asano | |
| 7,864,979 B2 | 1/2011 | Fan et al. | |
| 7,911,653 B2 | 3/2011 | Saito | |
| RE42,473 E | 6/2011 | Gorian et al. | |
| 8,014,035 B2 | 9/2011 | Monga et al. | |
| 8,100,330 B2 | 1/2012 | Bulan | |
| 8,189,235 B2 | 5/2012 | Matsuzaki | |
| 8,335,014 B2 | 12/2012 | Muramatsu | |
| 8,599,457 B2 | 12/2013 | Iwamoto | |
| 9,344,600 B2 | 5/2016 | Chen et al. | |
| 2003/0030824 A1 | 2/2003 | Ogasahara et al. | |
| 2004/0148261 A1 | 7/2004 | Abe | |
| 2005/0259280 A1 | 11/2005 | Rozzi | |
| 2006/0072778 A1 | 4/2006 | Harrington | |
| 2006/0072781 A1 | 4/2006 | Harrington | |
| 2008/0080009 A1 | 4/2008 | Masui et al. | |
| 2008/0292129 A1 | 11/2008 | Fan et al. | |
| 2010/0040282 A1 | 2/2010 | Bala et al. | |
| 2010/0214577 A1 | 8/2010 | Owen | |
| 2011/0102847 A1 | 5/2011 | Wang et al. | |
| 2013/0063568 A1 | 3/2013 | Silverbrook | |
| 2015/0009410 A1 | 1/2015 | Ikushima | |
| 2015/0371124 A1 | 12/2015 | Okumura | |
| 2016/0364825 A1 | 12/2016 | Pan | |
| 2017/0154399 A1 | 6/2017 | Oliveira Da Silva | |
| 2018/0189605 A1 | 7/2018 | Wu | |

* cited by examiner

ENCODING INFORMATION USING DISJOINT HIGHLIGHT AND SHADOW DOT PATTERNS

BACKGROUND

Information may be encoded into printed images. For example, the encoded information about when and where the document was printed, and who printed the document.

BRIEF DESCRIPTION OF THE DRAWINGS

Various features of the techniques of the present application will become apparent from the following description of examples, given by way of example only, which is made with reference to the accompanying drawings, of which.

DETAILED DESCRIPTION

Dot patterns may be used to encode information into printed documents. For example, dot patterns may be used to encode information on documents with minimal visual distraction. As used herein, a dot pattern refers to a pattern of printed ink in which a relative position of dots is used to encode information. For example, a dot pattern of black dots may be printed on a sheet of paper to indicate the time, date, and serial number of the printer, among other information. The encoded dot patterns may then be detected to retrieve the encoded information. While black dots can be recovered when printed on a white background, the black dot may not be detectable and thus recoverable when printed on backgrounds of black or darker grays. For example, documents having lots of darker shades of black or at all may result in a substantial portion of encoded information being undetectable. Moreover, alignment of the dots during detection after printing may be difficult without the use of visually distracting alignment markers.

Described herein are techniques for encoding dot patterns into printed images using disjoint highlight and shadow dot patterns. A digital document can be described as an image, since the digital document includes an array of pixels. An image, as used herein, may include any combination of text, graphics, white, space, and photos. As used herein, a highlight dot pattern refers to a pattern to be printed in areas of highlights in an image. For example, a highlight may be a region with pixel values exceeding a threshold value in a particular color channel or set of grayscale values. A highlight dot may be rendered as a dark dot surrounded by lighter pixels. Similarly, a shadow dot pattern refers to a pattern to be printed in areas of shadows in an image. Shadows may include values of a particular color channel or grayscale of pixels in an image below the threshold. A shadow dot may be rendered as a light dot surrounded by darker pixels. In some examples, the highlight and shadow dot patterns may be used to deter copying and trace an origin of copied documents. In one example, the value of each of the dots in the highlight dot pattern and shadow dot pattern as printed out in an image may be based on original values of the source page pixel being replaced. In some examples, suitable dot values may be included in a lookup table to be used to replace source page pixels. Thus, the techniques described herein provide a flexible means for defining dot color and background color combinations. Furthermore, the techniques described herein may minimize impact to visual appearance of a color image with the embedded highlight and shadow dot patterns using a method for single color channel clipping by only changing values in the color channel used in recovery. The techniques described herein thus allow single channel detectability for the entire document while minimizing visibility of the dots in the pattern. Moreover, the techniques described herein may use existing printing processes and inks to encode a dot pattern that may be recovered regardless of the content on the page. For example, the page content may be empty white space, text, solid areas with various colors, or even more complex graphic patterns. In addition, halftone-based detection systems can correctly align both highlight and shadow dots using the techniques described herein.

Figure 1:
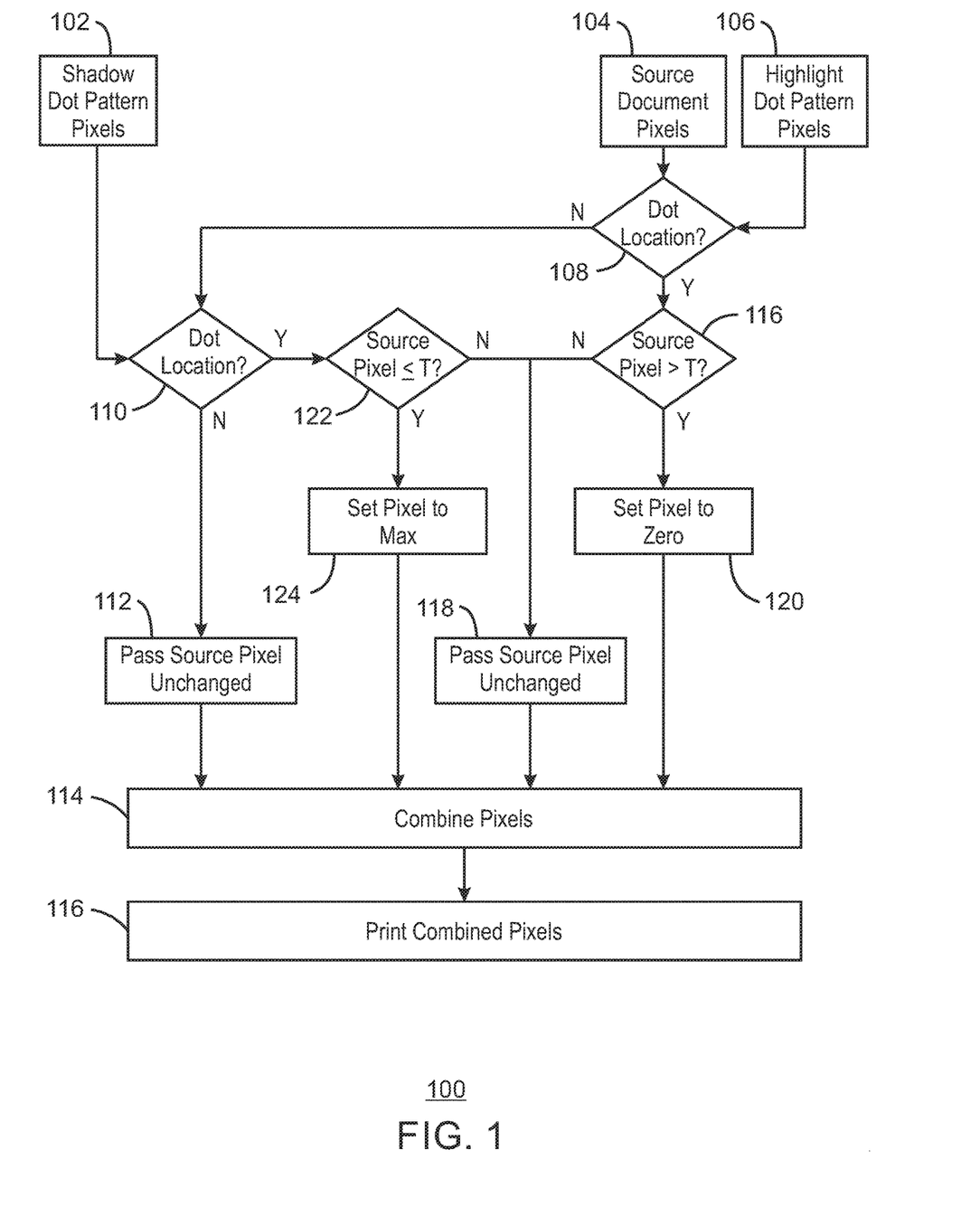
FIG. 1 is a schematic diagram illustrating an example method for encoding dot patterns into printed grayscale images using disjoint highlight and shadow dot patterns.

FIG. 1 is a schematic diagram illustrating an example method for encoding dot patterns into printed grayscale images using disjoint highlight and shadow dot patterns. The method 100 of FIG. 1 may be implemented in the computing device 902 of FIG. 9 below or example machine-readable storage medium 1000 of FIG. 10 below. For example, the method may be implemented using processor 904 or the processor 1002.

The example method 100 includes receiving a set of shadow dot pattern pixels 102. For example, the set of shadow dot pattern 102 may include information to be encoded into an image or document in areas of shadows. In some examples, the image may be color or grayscale. The method 100 includes receiving source document pixels 104 corresponding to the image or document. The method 100 includes receiving a set of highlight dot pattern pixels 106. For example, the set of highlight dot pattern pixels 106 may include information to be encoded into an image or document at areas of highlights. In some examples, the encoded information may be information about a printer, a date, time of printing, etc.

At decision diamond 108, a determination is made as to whether each of the source document pixels 104 corresponds to a highlight dot pattern 106 location. If a source page pixel does not correspond to a highlight dot pattern 106 location, then the method 100 may continue at block 110. If the source page pixel does correspond to a highlight dot pattern 106 location, then the method 100 may continue at block 116.

At decision diamond 110, a determination is made as to whether each of the source document pixels 104 corresponds to a shadow dot pattern 102 location. If a source page pixel does not correspond to a shadow dot pattern 102 location, then the method 100 may continue at block 111. If the source page pixel does correspond to a shadow dot pattern 102 location, then the method 100 may continue at block 122.

At block 112, the values of one or more source document pixels are passed unchanged to a printer for printing. For example, the source document pixel values may be printed as described in block 114 below. In some examples, for 8-bit pixels, the source pixel values may range from zero corresponding to black to 255 corresponding to white.

At block 114, the pixels from blocks 112, 124, 118, and 120 are combined and printed. The pixels may be combined to form an updated image to be printed. For example, the values may be printed onto a white sheet of paper or any other suitable medium.

At decision diamond 116, a determination is made as to whether a source document pixel corresponding to a highlight dot location exceeds a threshold pixel value. For example, the threshold pixel value may be a predetermined threshold pixel value. In some examples, the predetermined threshold pixel value may be greater than half of a highest pixel value to compensate for a printer dot gain. For example, the predetermined threshold pixel value may be about 70% or a value of 178 for 8-bit pixels having 256 possible values. If the source document pixel does not exceed the threshold pixel value, then the method 100 may proceed at block 118. If the source document pixel exceeds the threshold pixel value, then the method 100 may continue at block 120.

At block 118, the values of one or more source document pixels are passed unchanged to a printer for printing. For example, the source document pixel values may be printed as described in block 114 above.

At block 120, the values of one or more source document pixels may be set to zero, or otherwise decreased. For example, in response to detecting that a source document pixel corresponding to a highlight dot pattern exceeds a threshold value, then the source document pixel value may be replaced with black, or a darker shade of the highlight dot location.

At decision diamond 122, a determination is made as to whether a source document pixel corresponding to a shadow dot location does not exceed a threshold pixel value. For example, the threshold pixel value may be a predetermined threshold pixel value. In some examples, the predetermined threshold pixel value may be greater than half of a highest pixel value to compensate for a printer dot gain. For example, the predetermined threshold pixel value may be about 70% or a value of 178 for 8-bit pixels having 256 possible values. If the source document pixel does not exceed the threshold pixel value, then the method 100 may proceed at block 124. If the source document pixel exceeds the threshold pixel value, then the method 100 may continue at block 118 as described above.

At block 124, a source document pixel corresponding to a shadow dot locations are modified to have their values set to a maximum value, or a greater value. For example, the maximum value may represent the color white, or a lighter shade of the color of the shadow dot location. In some examples, for 8-bit pixels, the maximum value may be 255.

At block 126, the combined pixels are printed. For example, the combined pixels may be printed onto a sheet of white paper or any other suitable medium.

It is to be understood that the process diagram of FIG. 1 is not intended to indicate that all of the elements of the method 100 are to be included in every case. Further, any number of additional elements not shown in FIG. 1 may be included in the method 100, depending on the details of the specific implementation. For example, although described above with respect to grayscale values, the method may include a separation of RGB values of color pixels into individual color channel values, and separate processing for one or more of the RGB color channel values of the source page pixels as described with respect to grayscale values above. An example processing of blue color channel values is described with respect to FIG. 2 below.

Figure 2:
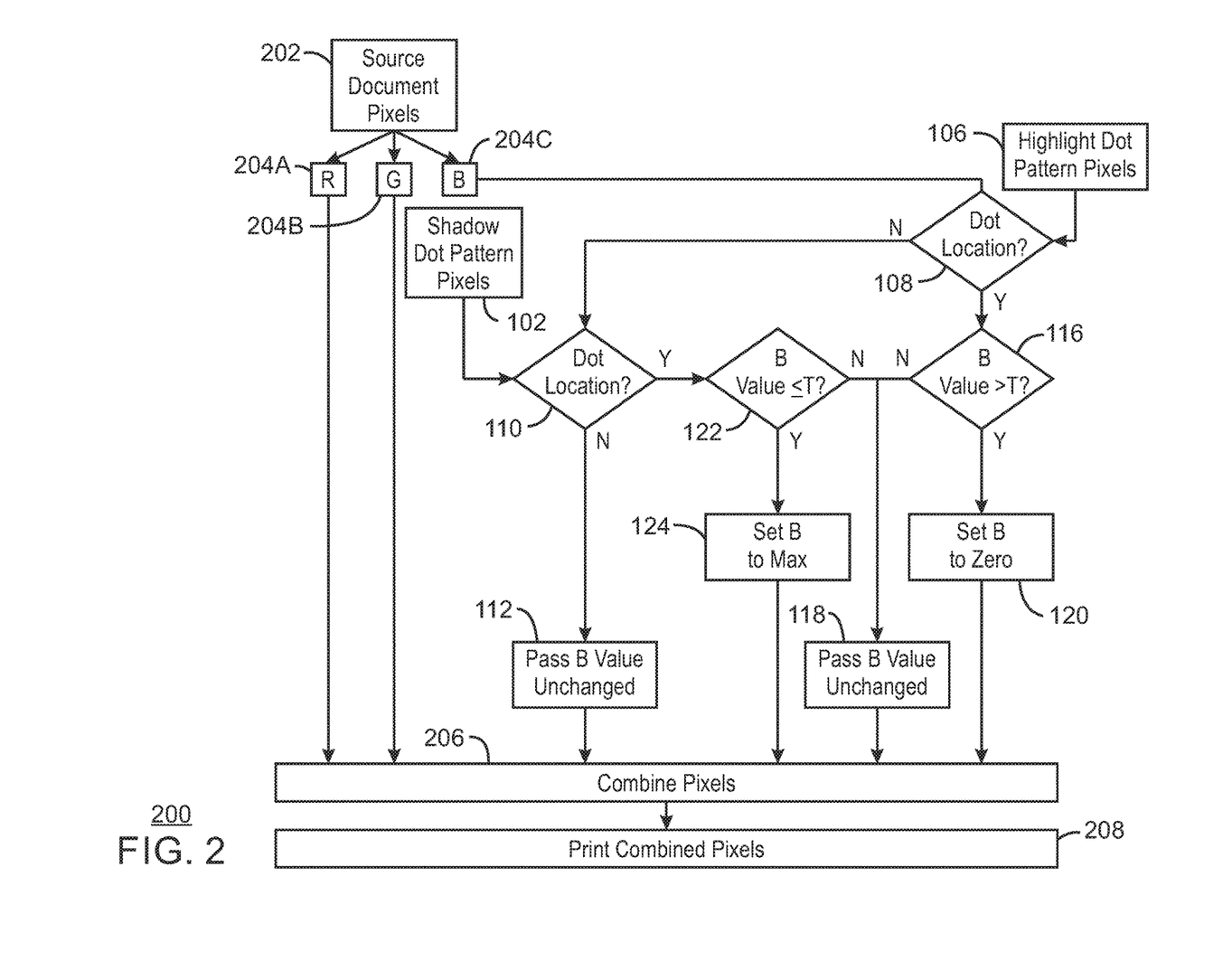
FIG. 2 is a schematic diagram illustrating an example method for encoding dot patterns into printed color images using disjoint highlight and shadow dot patterns.

FIG. 2 is a schematic diagram illustrating an example method for encoding dot patterns into printed color images using disjoint highlight and shadow dot patterns. The example method 200 of FIG. 2 may be implemented in the computing device 902 of FIG. 9 below or example machine-readable storage medium 1000 of FIG. 10 below. For example, the method 200 may be implemented using processor 904 or the processor 1002.

The method 200 of FIG. 2 includes similarly numbered elements from FIG. 1. For example, the set of shadow dot pattern pixels 102 and highlight dot pattern pixels 106 may be received, and compared with received source document pixels, as described above in FIG. 1. However, in the method 200 of FIG. 2, the source document pixels 202 may be color pixels that are separated into red 204A, green 204B, and blue 204C color channels. The red channel pixels 204A and the green channel pixels 204B may be sent direct to be printed at block 206. The blue channel pixels 204C may be processed similarly to the grayscale values of method 100 above.

Figure 3:
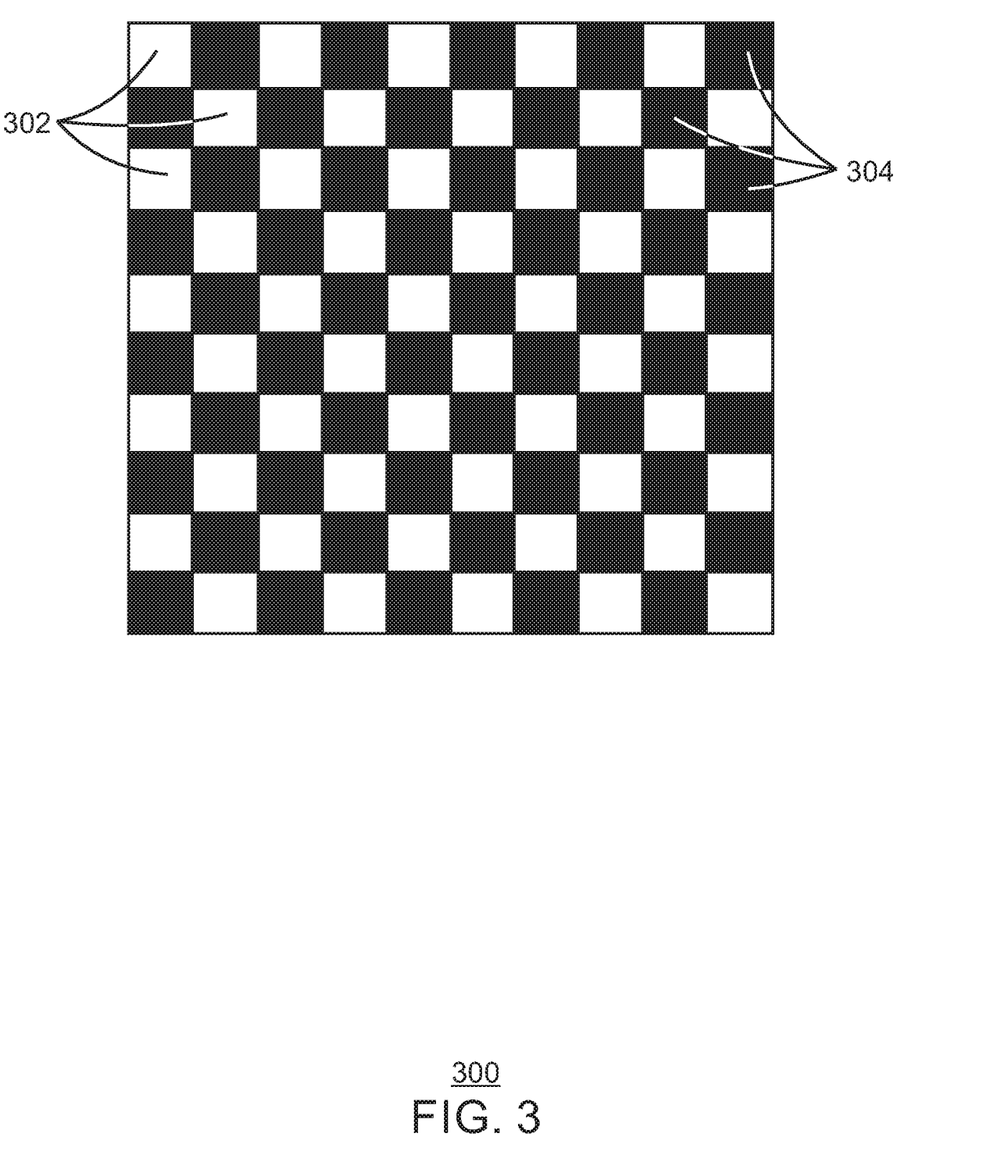
FIG. 3 is a diagram of an example checkerboard pattern for arranging highlight and shadow dot patterns.

FIG. 3 is a diagram of an example checkerboard pattern for arranging highlight and shadow dot patterns. The example checkerboard pattern 300 of FIG. 3 may be used by the computing device 902 of FIG. 9 below or example machine-readable storage medium 1000 of FIG. 10 below.

The checkerboard pattern 300 includes alternating sets of shadow cells 302 and highlight cells 304 for arranging shadow dot patterns and highlight dot patterns, respectively. For example, a shadow cell 302 may be a region in which a shadow dot may be placed within an image and are thus shown using white. An example shadow dot pattern is shown in FIG. 5 below. Similarly, a highlight cell 304 is a region in which a highlight dot may be placed within an image and are thus shown in black. An example, highlight dot pattern is shown in FIG. 4 below.

Figure 4:
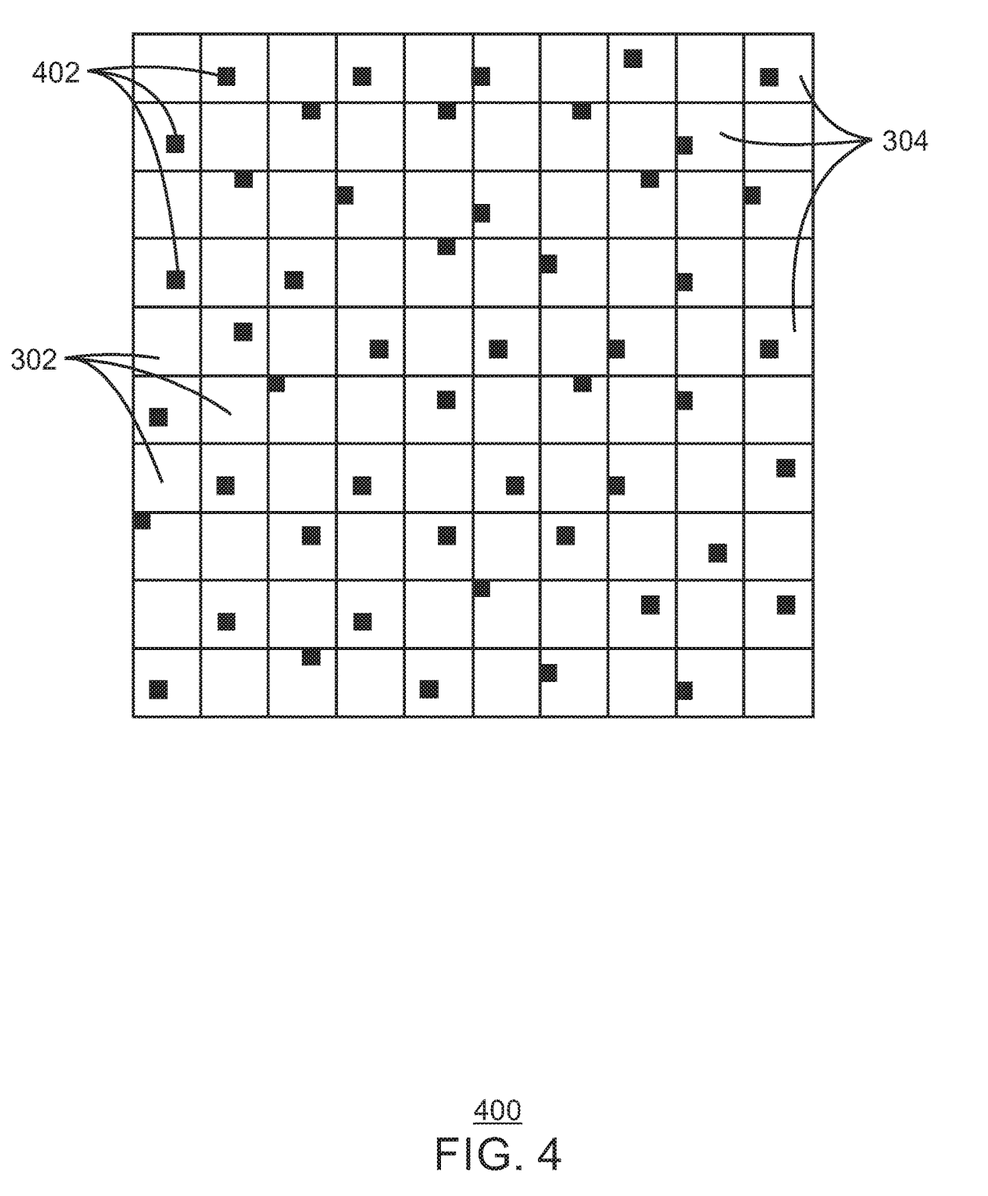
FIG. 4 is an example highlight dot pattern arranged according to a checkerboard pattern.
Figure 5:
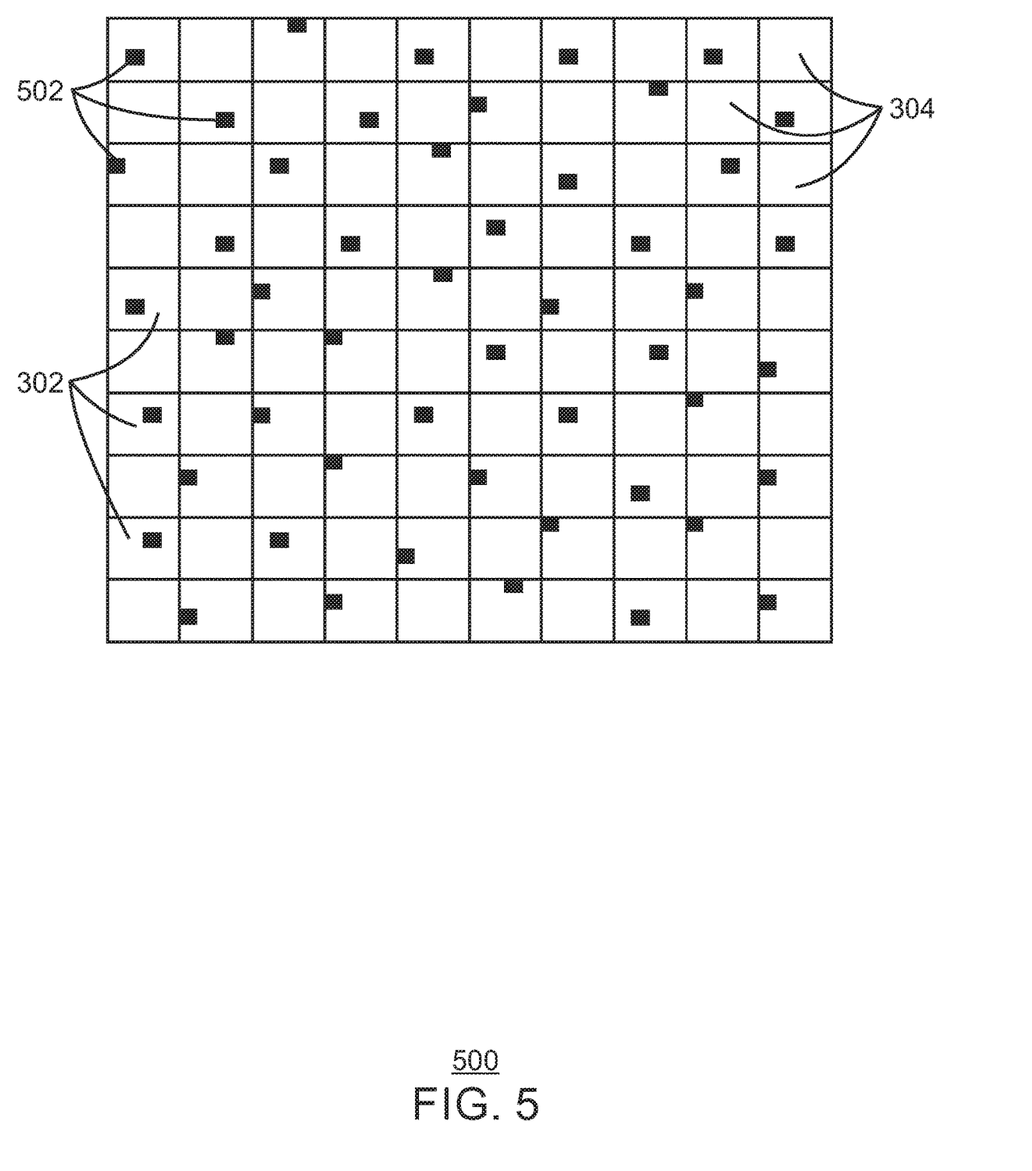
FIG. 5 is an example shadow dot pattern arranged according to a checkerboard pattern disjoint to the pattern of FIG. 4.

FIG. 4 is an example highlight dot pattern arranged according to a checkboard pattern. In particular, the highlight dot pattern 400 is arranged according to the checkerboard pattern of FIG. 3 above. The example highlight dot pattern 400 of FIG. 4 may be used by the computing device 902 of FIG. 9 below or example machine-readable storage medium 1000 of FIG. 10 below.

As shown in FIG. 4, the highlight dot pattern 400 includes a pattern of highlight dots 402 in the highlight cells 304. The shadow cells 302 are empty since the shadow cells 302 are reserved for shadow dots. For example, the shadow cells 302 may be encoded using a second pattern of dots, such as the shadow dot pattern shown in FIG. 5 below. The highlight dot pattern 400 may be used to encode information into images. For example, the information may be encoded by shifting the placement of the highlight dots 402 within the highlight cells 304. For example, the highlight dots 402 may be displaced from a default position within each of the highlight cells 304 in order to encode some value. An example portion of an image encoded using a highlight dot pattern is shown in FIG. 6 below.

FIG. 5 is example shadow dot pattern arranged according to a checkerboard pattern disjoint to the pattern of FIG. 4. In particular, the shadow dot pattern 500 is arranged according to the checkerboard pattern of FIG. 3 above. The example shadow dot pattern 500 of FIG. 5 may be generated by the computing device 902 of FIG. 9 below or example machine-readable storage medium 1000 of FIG. 10 below.

As shown in FIG. 5, the shadow dot pattern 500 includes a pattern of shadow dots 502 in the shadow cells 302. The highlight cells 304 are empty because the highlight cells 304 are reserved for highlight dots. For example, the highlight cells 304 may be encoded using a second pattern of dots, such as the highlight dot pattern of FIG. 4 above. The shadow dot pattern 500 may also be used to encode information into images. For example, the information may be encoded by shifting the placement of the shadow dots 502 within the shadow cells 302. For example, the shadow dots 502 may be displaced from a default position within each of the shadow cells 302 in order to encode some value. In some examples, the shadow cells 302 may encode the same information or different information from the highlight dots encoded within the highlight cells 304. An example portion of an image encoded using a shadow dot pattern is shown in FIG. 6 below.

Figure 6:
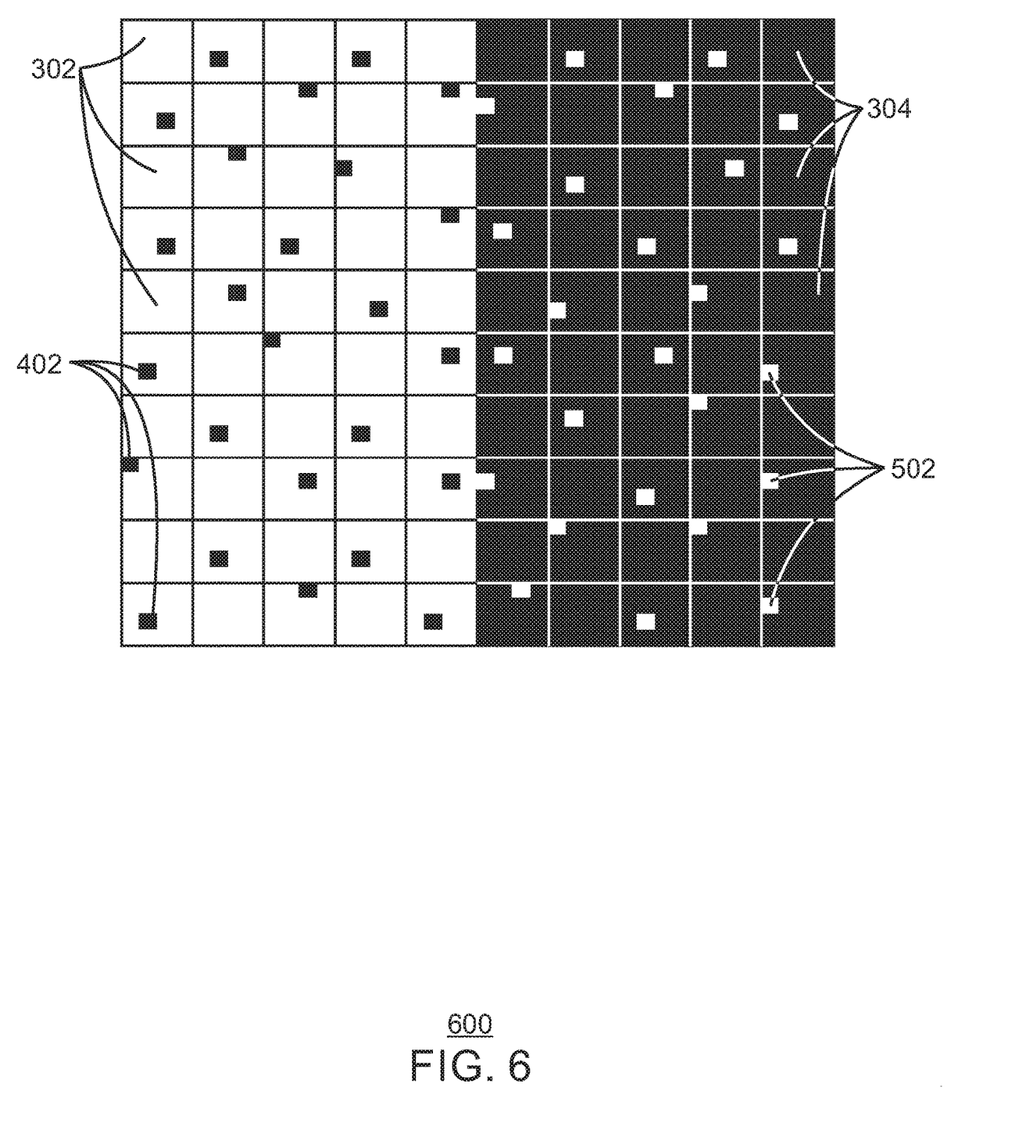
FIG. 6 is an example grayscale image encoded with a dot pattern using disjoint highlight and shadow dot patterns arranged in a checkboard pattern.

FIG. 6 is an example grayscale image encoded with a dot pattern using disjoint highlight and shadow dot patterns arranged in a checkerboard pattern. The example grayscale image 600 of FIG. 6 may be generated by the computing device 902 of FIG. 9 below or using example machine-readable storage medium 1000 of FIG. 10 below.

As shown in FIG. 6, the example grayscale image 600 includes a set of empty shadow cells 302 on the left side and shadow cells 302 including shadow dots 502 on the right side of the image 600. The image 600 includes highlight cells 304 with highlight dots 402 on the left side and empty highlight cells 304 on the right side of the image 600. Although shown in black, which corresponds to a value of zero, the right side of the image 600 may be similarly encoded using shadow dots 502 if the cells contained values of less than 128 for a 50% threshold or less than 178 for a 70% threshold. Likewise, the cells on the left are shown in white, corresponding to a value of 255 for 8-bit grayscale values, however could also be similarly encoded with highlight dots 402 for values ranging from 128 to 254. In some examples, using a method of circular coding, a two dimensional data array of dots may be designed so that the recovery system will fully decode the payload when subsampled in the checkerboard fashion. For example, the method of circular coding may be a two-dimensional coding method that allows recovery of data based on only a cropped portion of a code and without knowledge of a carrier image. The method may include repeating a payload with a fixed number of bits, assigning one bit to every symbol in the image-whether that symbol is data carrying or non-data carrying—with the goal of guaranteeing recovery of all the bits in the payload. The beginning of the payload may be determined by a phase code that is interleaved between groups of payload rows. The recovery system may find the phase row by evaluating candidate rows, and may rank confidence based on the sample variance.

It is to be understood that the grayscale image 600 of FIG. 6 is not intended to indicate that all of the elements of the grayscale image 600 are to be included in every case. Further, any number of additional elements not shown in FIG. 6 may be included in the grayscale image 600, depending on the details of the specific implementation. For example, any of the cells in the left side could have shadow dots given cell values of less than 128 or any other suitable threshold value. In addition, cells with values of less than 128 in the left side at the shadow dot locations would not have any shadow dots. Likewise, if the right side of grayscale image 600 included lighter areas of greater than 128 or any other threshold, then such areas would include highlight dots in the highlight cells 304 and no shadow dots in the shadow cells 302. Moreover, although described with respect to grayscale, the dot positions may alternatively be recovered by processing a blue channel as described above in FIG. 2. FIG. 6 may be also be viewed as the output of the system for blue clipping in FIG. 2, where highlight and shadow dots are located in their proper complementary checkerboards, and white represents high values of blue while black represents low values for blue.

Figure 7:
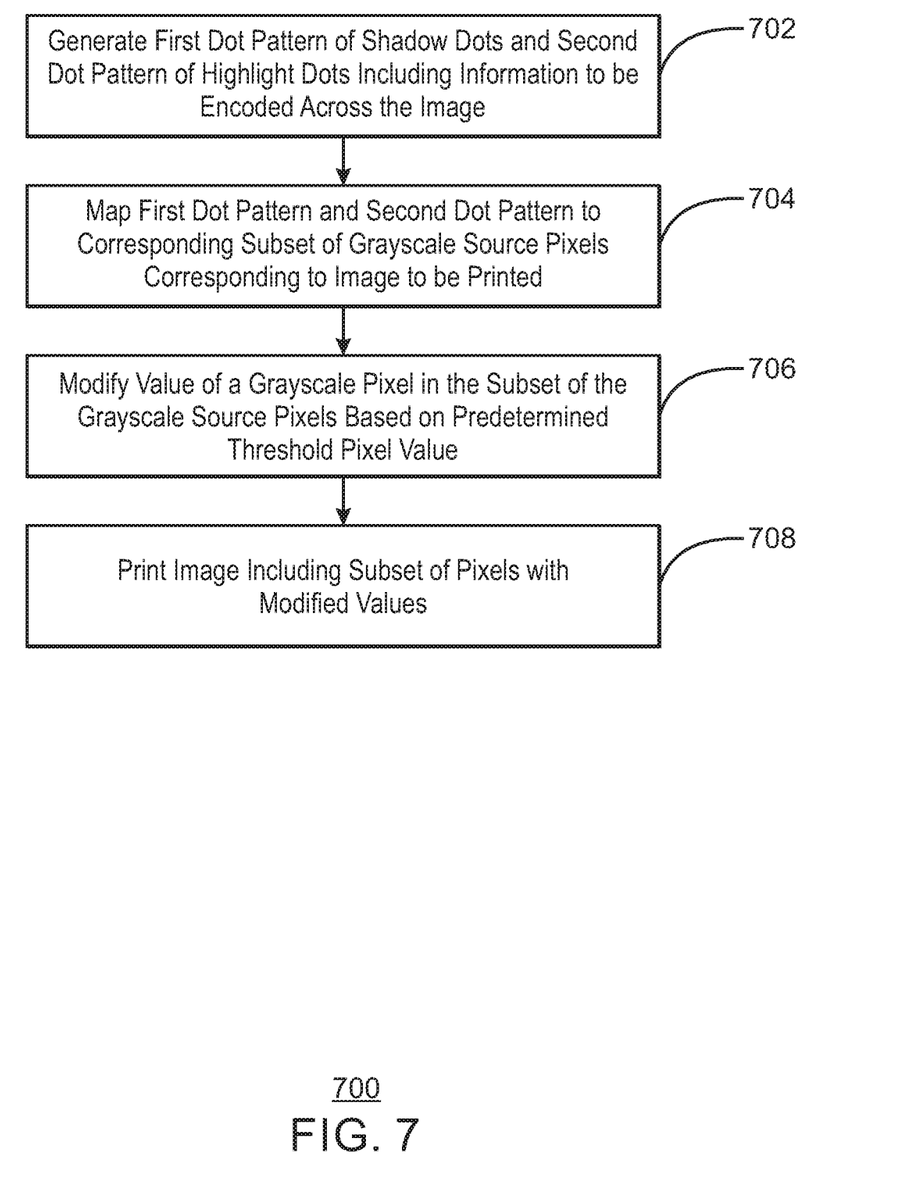
FIG. 7 is a process flow diagram illustrating an example method for encoding and printing images using disjoint highlight and shadow dot patterns.

FIG. 7 is a process flow diagram illustrating an example method for encoding and printing images using disjoint highlight and shadow dot patterns. The method of FIG. 7 is generally referred to by the reference number 700 and may be implemented in the computing device 902 of FIG. 9 below or example machine-readable storage medium 1000 of FIG. 10 below. The method may be implemented using processor 904 or the processor 1002.

At block 702, a first dot pattern of shadow dots and a second dot pattern of highlight dots including information to be encoded across an image are generated. The image may be a color image or a document containing both black text and images. In some examples, the information may include printer information, a date, time, who printed it, a transaction code, a document identifier, network statistics, user-driven measurements, among other information. Alternatively, the stored data in the dot pattern can be a linked to a database pointing to this information. In some examples, the size of the dots in the first pattern may be different from the size of the dots in the second pattern. For example, the size of the shadow dots may be larger than the size of the highlight dots to compensate for printer dot gain.

At block 704, the first dot pattern and second dot pattern of pixels are mapped to a corresponding subset of the grayscale source pixels. The grayscale source pixels correspond to an image to be printed. For example, the set of source pixels and a first dot pattern image may be compared one region, such as a pixel, at a time to match a corresponding subset of source pixels to the first dot pattern of pixels. Similarly, the second dot pattern may be compared one region at a time to match a corresponding subset of source pixels of the image. For example, the region compared may be a pixel or a group of pixels. In some examples, a set of color source pixels may be received and the set of greyscale source pixels may be extracted from the color source pixels based on a color channel to be used to detect the first dot pattern and the second dot pattern.

At block 706, a value of a grayscale pixel in the subset of the grayscale source pixels is modified based on a predetermined threshold pixel value. For example, grayscale pixels in corresponding to a first dot pattern of shadow dots may be set to zero in response to detecting that the grayscale pixels exceed the predetermined threshold pixel value. Otherwise, the grayscale pixels corresponding to a first dot pattern may be passed with their values unchanged to be printed. In some examples, grayscale pixels in corresponding to a second dot pattern of highlight dots may be set to a maximum value in response to detecting that the grayscale pixels do not exceed the predetermined threshold pixel value. Otherwise, the grayscale pixels corresponding to the second dot pattern of highlight dots may be passed unchanged to be printed. In some examples, the predetermined threshold pixel value may be greater than half of a highest pixel value to compensate for a printer dot gain.

At block 708, the image including the subset of pixels with modified values is printed. The first dot pattern and second dot pattern may then be used to detect the encoded information. In some examples, a scanned copy of the printed image may be received. The first and second dot patterns of pixels may then be detected in the printed image. Information from the detected dot pattern of pixels may be extracted from the detected first and second dot patterns. The image may also be aligned based on the detected first dot pattern and the second dot pattern.

It is to be understood that the process diagram of FIG. 7 is not intended to indicate that all of the elements of the method 700 are to be included in every case. Further, any number of additional elements not shown in FIG. 7 may be included in the method 700, depending on the details of the specific implementation. For example, a set of color pixels may be received and a color channel from the color pixels may be selected to obtain the grayscale source pixels. As one example, the grayscale source pixels may be extracted from a blue color channel as described in FIG. 2 above and FIG. 8 below.

Figure 8:
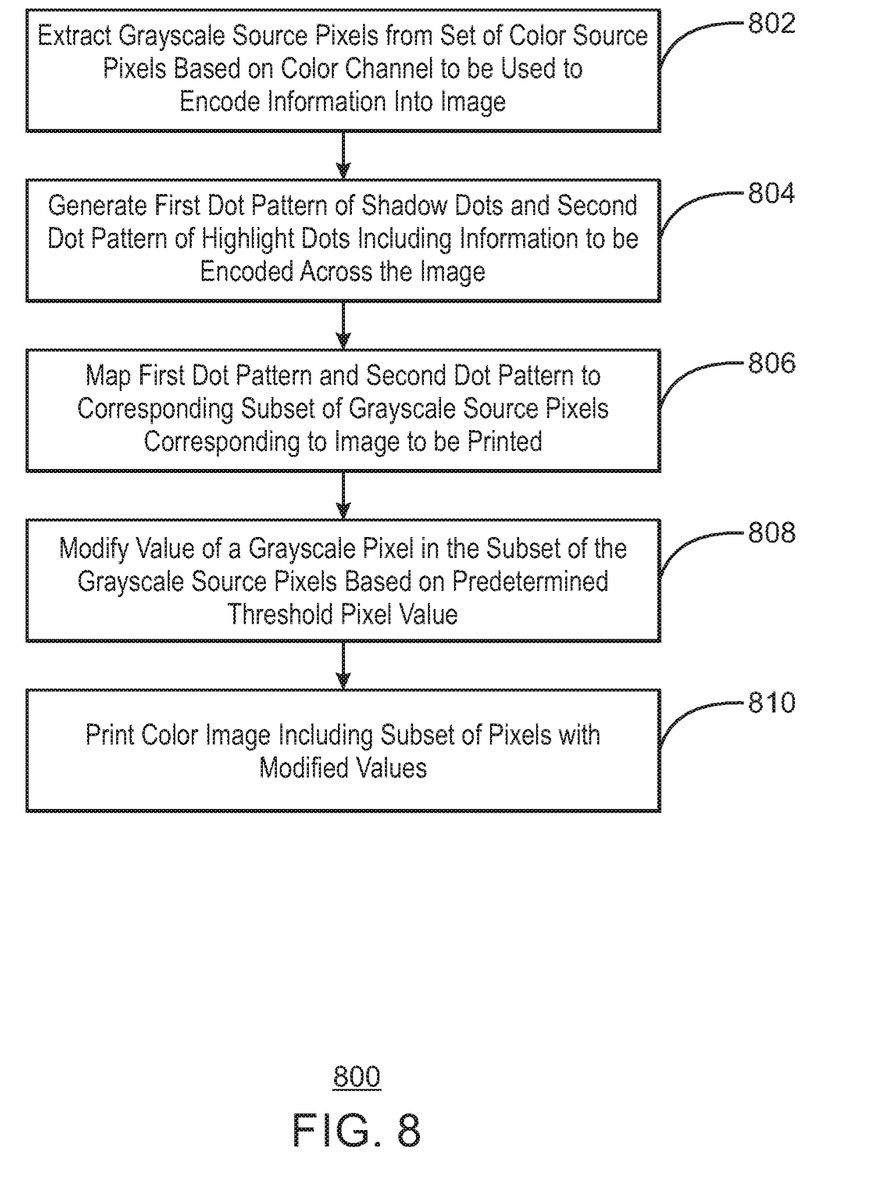
FIG. 8 is a process flow diagram illustrating an example method for encoding and printing color images with disjoint highlight and shadow dot patterns using grayscale clipping of a color channel.

FIG. 8 is a process flow diagram illustrating an example method for encoding and printing color images with disjoint highlight and shadow dot patterns using grayscale clipping of a color channel. The method 800 of FIG. 8 may be implemented in the computing device 902 of FIG. 9 below or example machine-readable storage medium 1000 of FIG. 10 below. The method 1000 may be implemented using processor 904 or the processor 1002.

At block 802, grayscale source pixels are extracted from a set of color source pixels based on color channel to be used to encode information into image. For example, the color channel may be the blue color channel as described in FIG. 2 above. In some examples, the color channel may be any color channel used to detect the first and second dot patterns.

At block 804, a first dot pattern of shadow dots and a second dot pattern of highlight dots including information to be encoded across the image are generated. For example, the first dot pattern and second dot pattern may be arranged based on a checkerboard pattern of disjoint alternating shadow cells and highlight cells.

At block 806, the first dot pattern and second dot pattern of pixels are mapped to a corresponding subset of grayscale source pixels. The grayscale source pixels correspond to an image to be printed. The size of the dot pattern of pixels may be the same size as a source document page of the set of source pixels. A source page and a dot pattern image are compared one region, such as a pixel, at a time to match a corresponding subset of source pixels to the dot pattern of pixels.

At block 808, a value of a grayscale pixel in the subset of the grayscale source pixels is modified based on a predetermined threshold pixel value. For example, grayscale pixels in corresponding to a first dot pattern of shadow dots may be set to zero in response to detecting that the grayscale pixels exceed the predetermined threshold pixel value. Otherwise, the grayscale pixels corresponding to a first dot pattern may be passed with their values unchanged to be printed. In some examples, grayscale pixels in corresponding to a second dot pattern of highlight dots may be set to a maximum value in response to detecting that the grayscale pixels do not exceed the predetermined threshold pixel value. Otherwise, the grayscale pixels corresponding to the second dot pattern of highlight dots may be passed unchanged to be printed.

At block 810, the image including the subset of pixels with modified values is printed. The image may be printed onto any suitable medium, such as a white sheet of paper.

It is to be understood that the process diagram of FIG. 8 is not intended to indicate that all of the elements of the method 800 are to be included in every case. Further, any number of additional elements not shown in FIG. 8 may be included in the method 800, depending on the details of the specific implementation.

Figure 9:
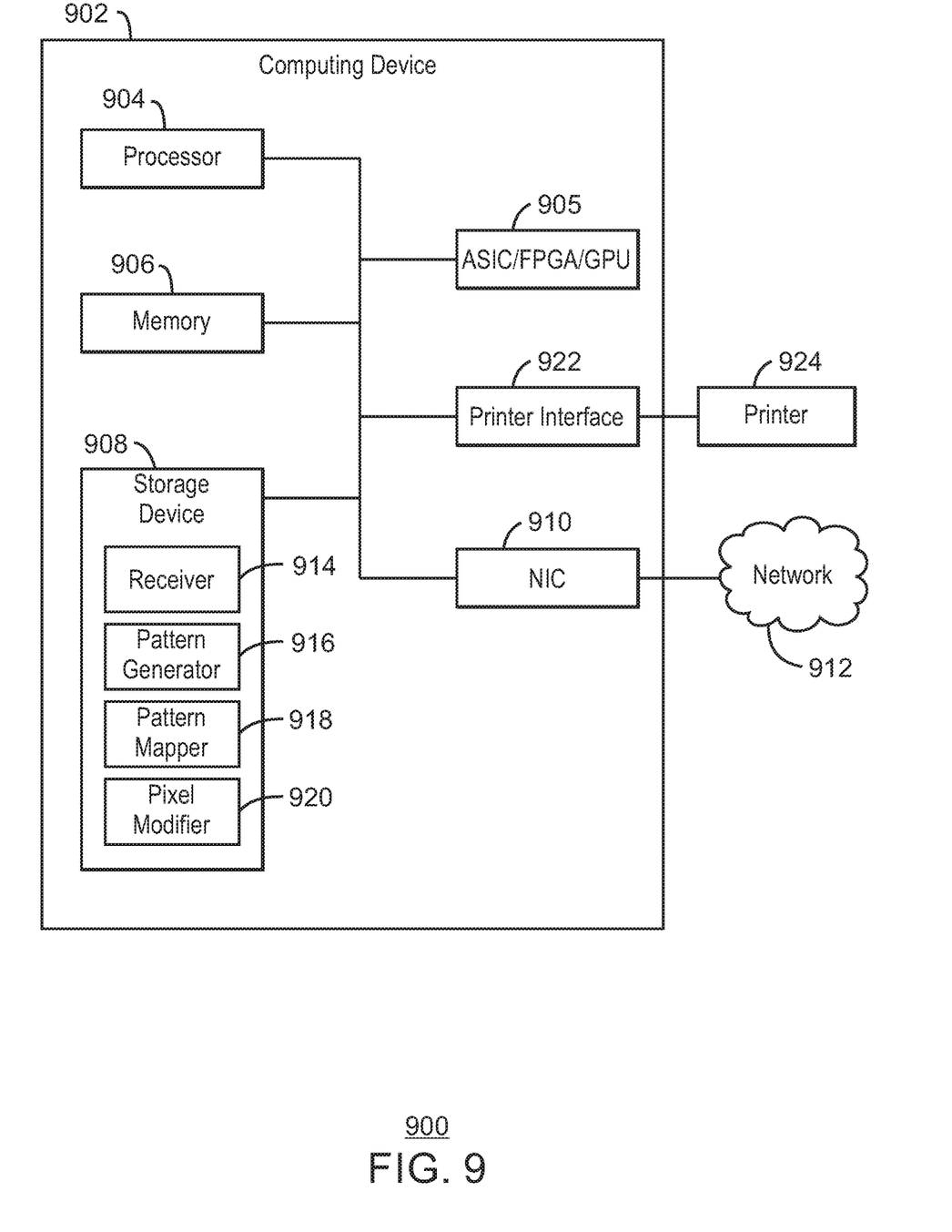
FIG. 9 is block diagram of an example computing device to modify and print images with encoded dot patterns based on source pixel values.

FIG. 9 is a block diagram of an example computing device 902 to modify and print images with encoded dot patterns based on source pixel values. The computing device 902 may be a printing device. The computing device 902 may include a processor 904, memory 906, a machine-readable storage 908, and a network interface 910 to connect computing system 902 to network 912. The network interface 910 may be a network interface card (NIC).

In some examples, the processor 904 may be a main processor that is adapted to execute the stored instructions. Moreover, more than one processor 904 may be employed. The processor 904 may be a single core processor, a multi-core processor, a computing cluster, or any number of other configurations. The processor 904 may be implemented as Complex Instruction Set Computer (CISC) or Reduced Instruction Set Computer (RISC) processors, x86 Instruction set compatible processors, ARMv7 Instruction set compatible processors, multi-core, or any other microprocessor or central processing unit (CPU). In some examples, the computing device 900 may use an application-specific integrated circuit (ASIC), field-programmable gate array (FPGA), or graphics processing unit (GPU) 905 to process images instead of, or in addition to, the processor 904. The ASIC/FPGA/GPU 905 may be a physical processing unit that may be configured to perform the techniques described herein.

The memory 906 may be one or more memory devices. The memory 906 may be volatile memory or nonvolatile memory. In some examples, the memory 906 may include random access memory (RAM), cache, read only memory (ROM), flash memory, and other memory systems.

The storage 908 is machine-readable storage and may include volatile and nonvolatile memory. The machine-readable storage 908 may be electronic, magnetic, optical, or other physical storage device that stores executable instructions (e.g., code, logic). Thus, the machine-readable storage 908 medium may be, for example, RAM, an Electrically-Erasable Programmable Read-Only Memory (EEPROM), a storage drive such as a hard drive or solid state drive (SSD), an optical disc, and the like. The storage 908 may also include storage or memory external to the computing device 902. Moreover, as described below, the machine-readable storage medium 908 may be encoded with executable instructions (e.g., executed by the one or more processors 904) for prioritizing data. For example, the machine-readable storage medium 908 may be encoded with executable instructions for modifying and printing images with encoded dot patterns based on source pixel color.

The NIC 910 may couple the computing system 902 to a network 912. For example, the NIC 910 may connect computing system 902 to a local network 912, a virtual private network (VPN), or the Internet. The NIC 910 may include an Ethernet controller. In some examples, the network includes a database (not shown). For example, the database may include information to be encoded as dot patterns.

The storage device 908 may include a receiver 914, a pattern generator 916, pattern mapper 918, a pixel modifier 920, and a printer 922. The receiver 914 may receive a set of greyscale source pixels corresponding to an image to be printed. The pattern generator 916 may generate a first dot pattern of shadow dots and second dot pattern of highlight dots. The first dot pattern and second dot pattern may include information to be encoded across the image. In some examples, the size of the shadow dots may be larger than the size of the highlight dots. For example, the size of the shadow dots may be set to a larger size than the highlight dots to compensate for a printer dot gain. The first dot pattern and the second dot pattern may be two disjoint complementary checkerboard patterns. The pattern mapper 918 may map the first dot pattern and the second dot pattern to a corresponding subset of the greyscale source pixels. The pixel modifier 920 may modify a value of a greyscale pixel in the subset of the greyscale source pixels based on a predetermined threshold pixel value. For example, the value of the greyscale pixel may be set to a highlight dot value in response to detecting that the predetermined threshold pixel value is exceeded or set to a shadow dot value in response to detecting that the predetermined threshold value is not exceeded. In some examples, the predetermined threshold pixel value may be greater than half of a highest pixel value to compensate for a printer dot gain. In some examples, the pixel modifier 920 may use a lookup table to determine a replacement value for the greyscale pixel. For example, the lookup table predefined based on the predetermined threshold.

The receiver 914, pattern generator 916, pattern mapper 918, and pixel modifier 920, may be instructions (e.g., code, logic, etc.) stored in the machine-readable storage 908 and executed by the processor 904 or other processor to direct the computing device 900 to implement the aforementioned actions. As described above, an ASIC, FPGA, or GPU 905 may also be employed. In other words, one or more ASICs, FPGAs, or GPUs may be customized for the aforementioned actions implemented via the receiver 914, pattern generator 916, and pattern mapper 918, and pixel modifier 920.

The storage 908 may also include generated lookup tables used to select colors for dot patterns. The storage 908 may also include one or more dot patterns to be encoded into printed documents.

The computing device 902 includes a printer interface 922 connecting the computing device 902 to a printer 924. In some examples, the printer interface 922 may be built into the printer 924. The printer 924 may print images including the subset of pixels with modified values.

The block diagram of FIG. 9 is not intended to indicate that the computing device 902 is to include all of the components shown in FIG. 9. Further, the computing device 902 may include any number of additional components not shown in FIG. 9, depending on the details of the specific implementation.

Figure 10:
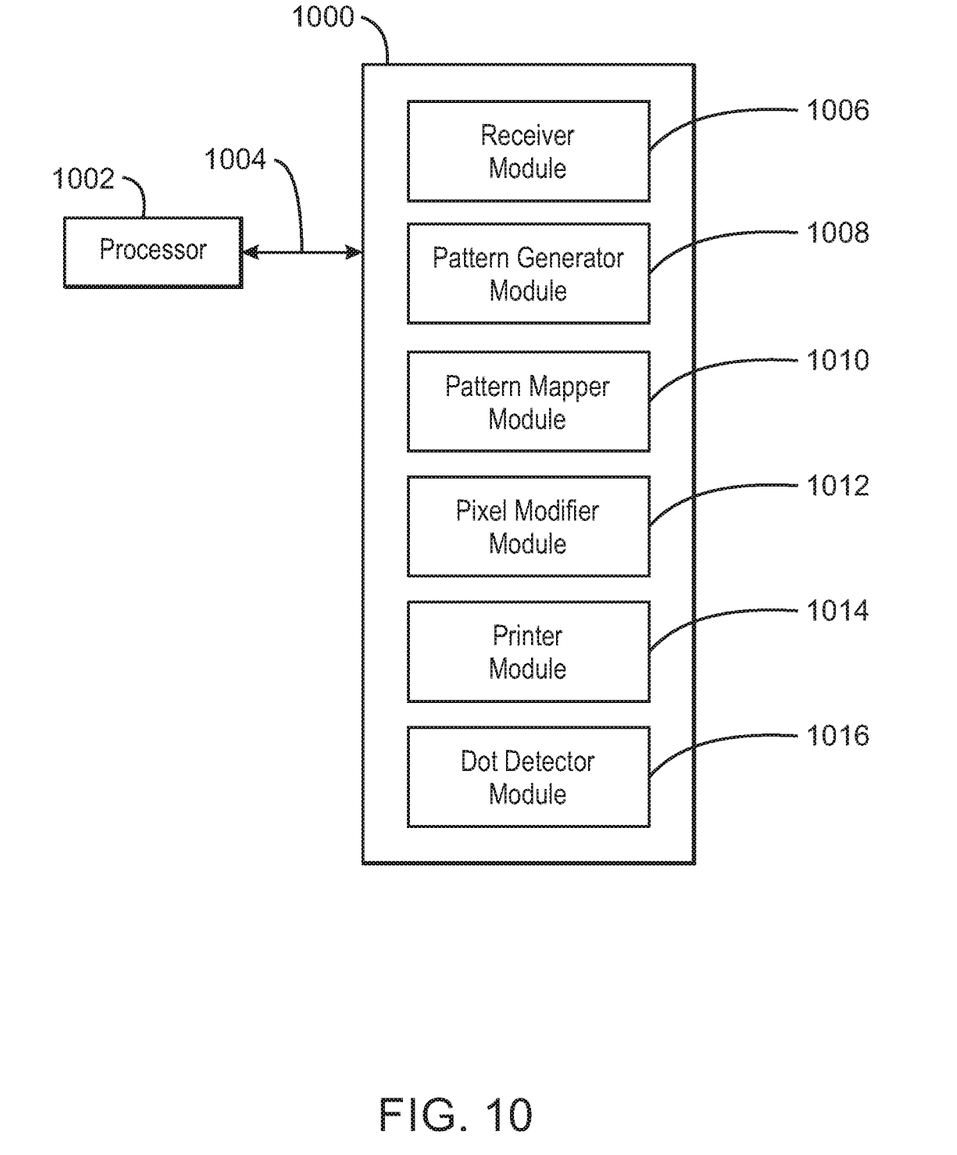
FIG. 10 is a block diagram of an example machine-readable storage medium that can be used to modify and print images with encoded dot patterns based on source pixel values.

FIG. 10 is a block diagram of an example machine-readable storage medium that can be used to modify and print images with encoded dot patterns based on source pixel values. The machine-readable medium is generally referred to by the reference number 1000. The machine-readable medium 1000 may include RAM, a hard disk drive, an array of hard disk drives, an optical drive, an array of optical drives, a non-volatile memory, a flash drive, a digital versatile disk (DVD), or a compact disk (CD), among others.

The machine-readable storage medium 1000 may be accessed by a processor 1002 over a bus 1004. The processor 1002 may be a processor of a computing device, such as the processor 904 of FIG. 9. Furthermore, as indicated, the machine-readable medium 1000 may include code configured to perform the methods and techniques described herein. The various logic components discussed herein may be stored on the machine-readable medium 1000. Portions 1006, 1008, 1010, 1012, and 1014 of the machine-readable storage medium 1000 may include receiver module code, pattern generator module code, pattern mapper module code, pixel modifier module code, and printer module code, respectively, which may be executable code, or machine readable instructions, that direct a processor or controller in performing the techniques discussed with respect to the preceding figures.

The various logic (e.g., instructions, code) components discussed herein may be stored on the tangible, non-transitory machine-readable medium 1000 as indicated in FIG. 10. For example, the machine-readable medium 1000 may include the receiver module 1006 that, when executed by a processor, directs the processor or a computing device to receive a set of greyscale source pixels corresponding to an image to be printed. In some examples, the receiver module 1006, when executed by a processor, may direct the processor or a computing device to receive a set of color source pixels and extract the set of greyscale source pixels from the color source pixels based on a color channel to be used to detect the first dot pattern and the second dot pattern. The machine-readable medium 1000 may also include the pattern generator module 1008 that, when executed by a processor, directs the processor or a computing device to generate a first dot pattern of shadow dots and second dot pattern of highlight dots, the first dot pattern and second dot pattern including information to be encoded across the image. In some examples, the pattern generator module 1008, when executed by a processor, directs the processor or a computing device to generate the shadow dots with a size that is larger than the size of the generated highlight dots. The machine-readable medium 1000 may also include the pattern mapper module 1010 that, when executed by a processor, directs the processor or a computing device to map the first dot pattern and the second dot pattern to a corresponding subset of the greyscale source pixels. The machine-readable medium 1000 may include the pixel modifier module 1012 that, when executed by a processor, directs the processor or a computing device to modify a value of a greyscale pixel in the subset of the greyscale source pixels based on a predetermined threshold pixel value. The value of the greyscale pixel may be set to a highlight dot value in response to detecting that the predetermined threshold pixel value is exceeded or set to a shadow dot value in response to detecting that the predetermined threshold value is not exceeded. In some examples, the pixel modifier module 1012, when executed by a processor, directs the processor or a computing device to set the predetermined threshold pixel value greater than half of a highest pixel value to compensate for a printer dot gain. The pixel modifier module 1010 may also direct the processor or a computing device to set the value of the clipping channel color to a maximum value in response to detecting that the original value of the clipping channel color of a pixel in the subset of source pixels is less than a threshold. The pixel modifier module 1010 may direct the processor or a computing device to set the value of the clipping channel color to zero in response to detecting that the value of the clipping channel color of a pixel in the subset of source pixels is greater than a threshold. The pixel modifier module 1010 may also direct the processor or a computing device to set the value of the clipping channel color to a maximum value in response to detecting that a most significant bit of the original value of the clipping channel color of a pixel in the subset of source pixels is equal to zero. The pixel modifier module 1010 may also direct the processor or a computing device to set the value of the clipping channel color to zero in response to detecting that the most significant bit of the original value of the clipping channel color of a pixel in the subset of source pixels is equal to one. The pixel modifier module 1010 may also direct the processor or a computing device to modify the value of at least one additional clipping channel color in the subset of source pixels based on an original value of the at least one additional clipping channel color. The clipping channel color, the at least one additional clipping channel color, or any combination thereof, may be used to detect the dot pattern of pixels. The machine-readable medium 1000 may include a printer module 1012 that, when executed by a processor, direct the processor or a computing device to print the image including the subset of pixels with modified values. In some examples, the machine-readable medium 1000 may include a dot detector module 1016 that, when executed by a processor, directs the processor or a computing device to receive a copy of the printed image, detect the dot pattern of pixels and extract information from the detected dot pattern of pixels. For example, dot detector module 1016, when executed by a processor, may direct the processor or a computing device to detect the first dot pattern and the second dot pattern in the printed image, and align the image based on the detected first dot pattern and the second dot pattern. Although shown as contiguous blocks, the logic components may be stored in any order or configuration. For example, if the machine-readable medium 1000 is a hard drive, the logic components may be stored in non-contiguous, or even overlapping, sectors.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method comprising:
   generating a first dot pattern of shadow dots and second dot pattern of highlight dots, the first dot pattern and second dot pattern comprising information to be encoded across the image;
   mapping the first dot pattern and the second dot pattern to a corresponding subset of the greyscale source pixels, the greyscale source pixels corresponding to an image to be printed;
   modifying a value of a greyscale pixel in the subset of the greyscale source pixels based on a predetermined threshold pixel value, wherein the value of the greyscale pixel is set to a highlight dot value in response to detecting that the predetermined threshold pixel value is exceeded or set to a shadow dot value in response to detecting that the predetermined threshold value is not exceeded; and
   printing the image comprising the subset of pixels with modified values.

2. The method of claim 1, wherein the predetermined threshold pixel value is greater than half of a highest pixel value to compensate for a printer dot gain.

3. The method of claim 1, wherein a size of the dots in the first pattern is different from the size of the dots in the second pattern.

4. The method of claim 1, comprising receiving a set of color source pixels and extracting the set of greyscale source pixels from the color source pixels based on a color channel to be used to detect the first dot pattern and the second dot pattern.

5. The method of claim 1, comprising detecting the first dot pattern and the second dot pattern in the printed image, and aligning the image based on the detected first dot pattern and the second dot pattern.

6. An apparatus comprising:
   a receiver to receive a set of greyscale source pixels corresponding to an image to be printed;
   a pattern generator to generate a first dot pattern of shadow dots and second dot pattern of highlight dots, the first dot pattern and second dot pattern comprising information to be encoded across the image;
   a pattern mapper to map the first dot pattern and the second dot pattern to a corresponding subset of the greyscale source pixels;
   a pixel modifier to modify a value of a greyscale pixel in the subset of the greyscale source pixels based on a predetermined threshold pixel value, wherein the value of the greyscale pixel is set to a highlight dot value in response to detecting that the predetermined threshold pixel value is exceeded or set to a shadow dot value in response to detecting that the predetermined threshold value is not exceeded; and
   a printer to print the image comprising the subset of pixels with modified values.

7. The apparatus of claim 6, wherein the predetermined threshold pixel value is greater than half of a highest pixel value to compensate for a printer dot gain.

8. The apparatus of claim 6, wherein a size of the shadow dots is larger than the size of the highlight dots.

9. The apparatus of claim 6, wherein the first dot pattern and the second dot pattern comprise two disjoint complementary checkerboard patterns.

10. The apparatus of claim 6, comprising a lookup table to be used to determine a replacement value for the greyscale pixel, wherein the lookup table predefined based on the predetermined threshold.

11. A non-transitory machine-readable storage medium encoded with instructions executable by a processor, the machine-readable storage medium comprising instructions to direct the processor to:
   receive a set of greyscale source pixels corresponding to an image to be printed;
   generate a first dot pattern of shadow dots and second dot pattern of highlight dots, the first dot pattern and second dot pattern comprising information to be encoded across the image;
   map the first dot pattern and the second dot pattern to a corresponding subset of the greyscale source pixels;
   modify a value of a greyscale pixel in the subset of the greyscale source pixels based on a predetermined threshold pixel value, wherein the value of the greyscale pixel is set to a highlight dot value in response to detecting that the predetermined threshold pixel value is exceeded or set to a shadow dot value in response to detecting that the predetermined threshold value is not exceeded; and print the image comprising the subset of pixels with modified values.

12. The machine-readable storage medium of claim 11, comprising instructions to direct the processor to set the predetermined threshold pixel value greater than half of a highest pixel value to compensate for a printer dot gain.

13. The machine-readable storage medium of claim 11, comprising instructions to direct the processor to generate the shadow dots with a size that is larger than the size of the generated highlight dots.

14. The machine-readable storage medium of claim 11, comprising instructions to receive a set of color source pixels and extract the set of greyscale source pixels from the color source pixels based on a color channel to be used to detect the first dot pattern and the second dot pattern.

15. The machine-readable storage medium of claim 11, further comprising instructions to direct the processor to detect the first dot pattern and the second dot pattern in the printed image, and align the image based on the detected first dot pattern and the second dot pattern.

\* \* \* \* \*